United States Patent
Zhang et al.

(10) Patent No.: US 11,917,435 B2
(45) Date of Patent: *Feb. 27, 2024

(54) NETWORK SPEED MAP

(71) Applicant: T-Mobile USA, Inc., Bellevue, WA (US)

(72) Inventors: Hongliang Zhang, Samammish, WA (US); Julian Loaiza, Redmond, WA (US); Kevin Hinson, Seattle, WA (US); Jacob Lee, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,702

(22) Filed: Nov. 2, 2022

(65) Prior Publication Data

US 2023/0060750 A1    Mar. 2, 2023

Related U.S. Application Data

(63) Continuation of application No. 17/036,178, filed on Sep. 29, 2020, now Pat. No. 11,503,486.

(51) Int. Cl.
*H04W 24/08*    (2009.01)
(52) U.S. Cl.
CPC .................................. *H04W 24/08* (2013.01)
(58) Field of Classification Search
None
See application file for complete search history.

(56) References Cited

U.S. PATENT DOCUMENTS

| | | |
|---|---|---|
| 9,609,560 B2 | 3/2017 | Cootey |
| 2007/0167174 A1 | 7/2007 | Halcrow et al. |
| 2010/0246507 A1* | 9/2010 | Dan ............... H04L 5/0044 370/329 |
| 2016/0277939 A1* | 9/2016 | Bertrand ............ H04W 16/18 |
| 2022/0104040 A1* | 3/2022 | Zhang ............... H04W 24/08 |

OTHER PUBLICATIONS

Office Action for U.S. Appl. No. 17/036,178, dated Mar. 21, 2022, Zhang, "Network Speed Map", 12 pages.

* cited by examiner

*Primary Examiner* — Saad Khawar
(74) *Attorney, Agent, or Firm* — Lee & Hayes P.C.

(57) ABSTRACT

A network speed map indicating data rates (e.g., download speeds) provided by a mobile network within a geographical area can be created based on crowd-sourced data. An example process includes receiving a plurality of data samples from mobile devices, each sample including a CQI value and a geolocation. Efficiency values can be determined from sampled CQI values associated with a bin of interest within the geographical area, and a spectrum efficiency value associated with the bin can be determined based on the determined efficiency values. A data rate (e.g., a download speed) associated with the bin can be estimated based on the spectrum efficiency value, and a network speed map showing one or more bins, including the bin, with estimated data rates (e.g., download speed) can be generated and displayed on a user computing device.

20 Claims, 9 Drawing Sheets

NETWORK SPEED MAP

RELATED APPLICATIONS

This application is a continuation of and claims priority to U.S. patent application Ser. No. 17/036,178, filed Sep. 29, 2020, Titled "NETWORK SPEED MAP," the entirety of which is incorporated herein by reference.

BACKGROUND

In the past, mobile network customers were concerned with whether they would have cellular coverage in certain geographical areas. This led to the creation of nationwide network coverage maps, which show where customers can and cannot connect to a cellular network using mobile devices. Since coverage of mobile networks has improved in recent years, customers have become less concerned about coverage. However, coverage does not necessarily mean that the mobile network also provides, in every geographic location within the coverage area, sufficient download speeds for services like audio/video streaming, video conferencing, gaming, augmented reality (AR) and virtual reality (VR), etc. Due to the lack of information about download speeds of a mobile network, mobile network customers may experience service interruptions and may only learn about those service interruptions after the fact. For example, a mobile network customer may be inconvenienced by a service interruption at a particular geographical location that provides slow download speeds. Furthermore, without information regarding network download speeds, wireless carriers cannot optimize download speed performance in their mobile networks, and customer care departments cannot optimize their troubleshooting process when mobile network customers experience service interruptions.

Although third party applications exist for a mobile network customer to test the download speed of a mobile network, these third party applications merely give the customer information about a download speed at a specific location and time. It is impracticable to perform such a direct download speed test over a large geographical area at any suitable resolution, and it is also impracticable to keep that information up-to-date in order to understand the bigger picture of the download speeds across a relatively large geographical area. Furthermore, these third party applications consume network capacity from network operators and data volumes from network service users when download speed tests are conducted.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
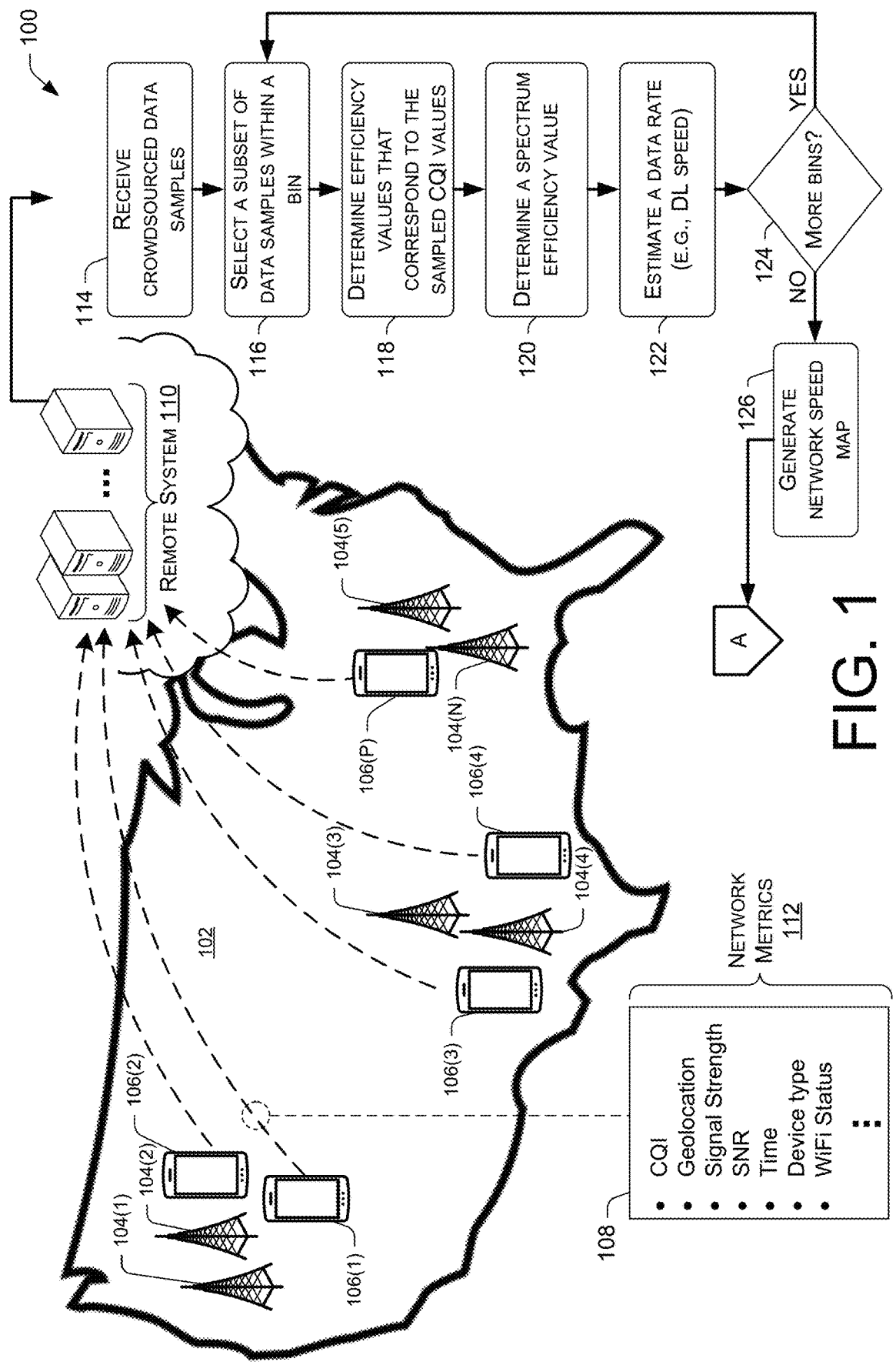
FIG. 1 illustrates a diagram and a flowchart of an example process for creating a network speed map for a geographical area based on crowd-sourced data samples, in accordance with various embodiments.

Disclosed herein are techniques, devices, and systems for creating a network speed map for a geographical area(s) based on crowd-sourced data. The network speed map indicates data rates provided by a mobile network for individual geographic bins within a geographical area. These data rates are sometimes referred to herein as "network speeds" and may include, without limitation, download speeds and/or upload speeds. The technique of using crowd-sourced data samples to estimate the network speeds of a mobile network allows for providing information about network speeds across a large geographical area (e.g., a nationwide network speed map) at a relatively high resolution. For example, network speeds can be calculated for relatively small bins within a geographical area (e.g., hexagonal bins with a radius no greater than about 10 meters). This provides mobile network customers with granular information about network speeds (e.g., download speeds of a mobile network) in a given geographical area, thereby informing customers about where they can go to get the best performance for services like audio/video streaming, video conferencing, gaming, AR and/or VR, etc. The disclosed network speed map can also help a network operator (or wireless carrier) determine how to optimize its mobile network, and it can allow a custom care department to provide improved customer service by troubleshooting customer issues (e.g., service interruptions) faster and more efficiently. The network speed map may also be used to improve development and marketing of new mobile applications, among other things.

In an illustrative example, as a mobile device is carried by a user between various geographical locations (sometimes referred to herein as "geolocations"), and as the mobile device is used to conduct communication sessions (e.g., phone calls) over a mobile network, a client application installed on the mobile device may be triggered to collect data samples. The client application may temporarily store the collected data samples in the mobile device's storage/memory, and, at a later time, the mobile device may send collected data samples to a remote system (e.g., a server hosted in the cloud). In some embodiments, collected data samples may be sent to the remote system on a pre-set schedule or during a predetermined time period (e.g. on a daily basis) and/or upon a data connection becoming available. These data samples may include various network metrics, as will be described in more detail below. In some embodiments, the network metrics included in each data sample sent to the remote system include, without limitation, a Channel Quality Indicator (CQI) value and a geolocation (e.g., a latitude and longitude of the mobile device at a time at which the data sample was collected). A CQI value may be determined by a mobile device based on a signal-to-interference and noise ratio (SINR) measurement at the mobile device's receiver. A mobile device may continuously measure and report CQI values to its serving base station. With the reported CQI, the serving base station may determine a Modulation and Coding scheme (MCS) for downlink data transmission to the mobile device. By collecting crowd-sourced data samples from a large number of mobile devices in this manner, the remote system is able to aggregate a large set of data samples that can be used to generate a network speed map, as described herein. Such a network speed map may indicate, among other things, data rates (sometimes referred to herein as "network speeds") provided by a mobile network within a geographical area. For example, the network speed map may indicate an estimated download speed(s) provided by a mobile network within a bin(s) of a geographical area. An individual bin can be of any suitable shape, and any suitable size, as described herein. Furthermore, the data rate (e.g., download speed) estimate for an individual bin can be expressed as a value in any suitable unit of measurement (e.g., megabits per second (Mbps)). If the indicated data rate (e.g., download speed) is relatively high (or fast), this may inform a customer that he/she can expect a data-intensive service (e.g., AR or VR gaming) to work on a mobile device with an adequate Quality of Service (QoS) within that bin. If, on the other hand, the indicated download speed is relatively low (or slow), this may inform a customer that he/she can expect a possible service interruption if a data-intensive service (e.g., AR or VR gaming) is accessed via a mobile device within that bin.

An example process implemented by a remote system (e.g., one or more server computers) for creating a network speed map based on crowd-sourced data may include receiving a plurality of data samples from a plurality of mobile devices. Each data sample may include, among other things, a CQI value and a geolocation (e.g., latitude, longitude) within a geographical area. For a bin of interest within the geographical area, the process may further include selecting a subset of the data samples that specify geolocations within that bin, and determining efficiency values that correspond to the CQI values specified in the subset of data samples. An efficiency value may be the measurement of a number of the actual information bits being carried per resource element (RE) when the RE is used for a communication or connection session in Long Term Evolution (LTE)- or New Radio (NR)-based mobile networks. A RE is a sub-carrier or the minimum frequency source for carrying data bits in a radio access network. For example, in LTE, a RE is a sub-carrier with the fixed bandwidth of 15 kilohertz (kHz), while in NR, a RE may be a subcarrier with varying bandwidth of 15 kHz, 30 kHz, 60 kHz, or 120 kHz, depending on the mobile network operational frequency bands (e.g. sub-6 gigahertz (GHz) bands, millimeter wave 28 GHz/39 GHz bands, etc.). In some embodiments, a CQI table may be accessed and used to determine the efficiency values that map to the sampled CQI values. The process may further include determining a spectrum efficiency value associated with the bin based at least in part on the efficiency values, and estimating a data rate (e.g., a download speed) associated with the bin based at least in part on the spectrum efficiency value. In some embodiments, the estimation of the data rate associated with the bin may be further based on a total number of resource elements (REs) in a subframe, and an overhead value. These example operations may be repeated for multiple bins to generate a network speed map that indicates estimated data rates (e.g., download speeds) associated with the multiple bins in a geographical area. The process may further include causing presentation of the network speed map on a display of a user computing device.

The disclosed techniques, devices, and systems provide various technical benefits and practical applications. For example, the techniques, devices, and systems described herein can improve a user experience of a mobile network customer. For example, customers may be able to see, from the disclosed network speed map (when the map is presented on a display of the customer's device), locations where he/she can get faster data rates (e.g., download speeds) in order to access and utilize services that receive and/or send data at a relatively high data rate, as compared to less-data-intensive services like conversational voice (e.g., voice over Long Term Evolution (VoLTE) calls, voice over New Radio (VoNR) calls, etc.). This allows a mobile network customer to plan ahead of time, such as before embarking on a trip. For example, the mobile network customer can identify areas along a travel route with faster download speeds so that customer knows he/she will be able to access services like video streaming, gaming, AR and/or VR, without experiencing service interruptions. Furthermore, unlike a direct download speed test (e.g., Speedtest® by Ookla® of Seattle, Wash.) that provides customers with information about a download speed at a specific location and time, the crowd-sourcing approach described herein can be scaled to a much larger geographical area at a high resolution, and the data rate information in the network speed map can be updated frequently at scale to maintain an understanding of current network speeds across a relatively large geographical area (e.g., a nation-wide network speed map).

As another example, the techniques, devices, and systems described herein can help a network operator (or wireless carrier) plan and/or optimize their mobile network, such as by implementing changes to a network topology to increase (or otherwise change) capacity and/or throughput in a given geographical area. For example, a wireless carrier might identify a populated downtown area where their mobile network provides coverage to mobile devices, yet the network provides a relatively slow download speeds on a few streets due to interference of nearby buildings. Using the information in the disclosed network speed map, the carrier can make changes to the network (e.g., by adding more, and/or more powerful, base station nodes in a given geographical area) to improve network speed performance.

As yet another example, the techniques, devices, and systems described herein can help a customer care department troubleshoot faster and more efficiently for mobile network customers in need of technical support. For example, a mobile network customer may call a customer care department to help resolve an issue where the customer is unable to stream video content at a current location. The customer care department can access the network speed map described herein, which can facilitate troubleshooting the issue(s) faster and more efficiently. For example, the network speed map may indicate that the download speed is relatively slow in a bin where the customer is located, and the customer care department may identify the cause of the slow download speed as a forested area near the customer's location with lots of trees. In this example, the customer care department can inform the customer that there is nothing wrong with the carrier's service or the customer's mobile device, but that the forested environment is causing download speed issues. Alternatively, if the network speed map indicates that the download speed is relatively fast in the bin where the customer is located, the customer care department may identify the source of the issue as the type of phone the customer is using (e.g., an outdated device model).

As yet another example, the techniques, devices, and systems described herein can improve development and marketing of new mobile applications. For example, an application developer may develop a new AR and/or VR application for mobile devices, and the developer may want their new AR/VR application to be utilized on mobile networks that provide high download speeds for a better user experience with the new mobile application. Accordingly, the marketing efforts of the developer may be focused on mobile networks that offer high download speeds, which can be identified using the network speed map described herein.

As yet another example, the techniques, devices, and systems described herein may further allow one or more devices to conserve resources with respect to processing resources, memory resources, networking resources, power resources, financial resources, etc., in the various ways described herein. For example, instead of licensing and using a third party application/service that sends test data back and forth between a mobile device and the network in real time to determine download speed performance at a given location, the crowd-sourcing approach described herein may avoid unnecessary network bandwidth consumption and/or power consumption of the mobile device because it does not rely on sending/receiving test data in real-time to determine network performance. This may also save customers money if they pay for data usage.

Disclosed herein are processes, as well as systems comprising one or more processors and one or more memories (e.g., non-transitory computer-readable media) storing computer-executable instructions that, when executed by the one or more processors perform various acts and/or processes disclosed herein.

FIG. 1 illustrates a diagram and a flowchart of an example process 100 for creating a network speed map for a geographical area 102 based on crowd-sourced data samples, in accordance with various embodiments. FIG. 1 illustrates cells 104 that are usable by mobile devices 106 to access a mobile network from various geolocations throughout the geographical area 102. FIG. 1 shows a plurality of mobile devices 106(1), 106(2), 106(3), 106(4), . . . , 106(P) (collectively 106) distributed throughout the geographical area 102, which, in the example of FIG. 1, represents the contiguous United States of America, although it is to be appreciated that the mobile devices 106 and the cells 104 may be distributed throughout any suitable geographical area 102 anywhere in the world, at any scale or level of granularity when implementing the techniques and systems described herein.

An individual mobile devices 106 may be implemented as any suitable computing device configured to communicate over a wireless network, including, without limitation, a mobile phone (e.g., a smart phone), a tablet computer, a laptop computer, a portable digital assistant (PDA), a wearable computer (e.g., electronic/smart glasses, a head-mounted display (HMD), a smart watch, fitness trackers, etc.), and/or any similar device. In accordance with various embodiments described herein, the terms "wireless communication device," "wireless device," "communication device," "mobile device," "computing device," "electronic device," "user device," and "user equipment (UE)" may be used interchangeably herein to describe any device (e.g., a mobile device 106) capable of performing the techniques described herein. The mobile devices 106 may be capable of communicating wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), voice over New Radio (VoNR)—e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

FIG. 1 illustrates a plurality of cells 104(1), 104(2), 104(3), 104(4), 104(5), . . . , 104(N) (collectively 104) distributed throughout the geographical area 102. As used herein, a "cell" 104 represents an access point (e.g., a cell tower, base station, etc.) and the coverage area created by the access point. The "coverage area", in this context, means the area or space around the access point in which a mobile device 106 can effectively access a mobile network or cellular network (e.g., a core network, such as an Internet Protocol Multimedia Subsystem (IMS) core) using radio frequency (RF) transmissions. The access point itself may include electronic communications equipment, antennae, and the like for communicating with mobile devices 106 using RF waves that are detectable within the coverage area of the cell 104. Each cell 104 may be associated with a particular radio access technology (RAT), or a combination of different RATs (e.g., 4G LTE RATs, and/or 5G RATs, etc.). In this manner, a given mobile device 106 may employ whichever type of RAT is associated with the cell 104 to which the given mobile device 106 is attached. Accordingly, any individual cell 104 may be enabled by one or more types of access points, such as a Base Transceiver Station (BTS) and/or a Node B that provides second generation (2G) and/or third generation (3G) service to attached mobile devices 106, and/or an eNB that provides 4G LTE service to attached mobile devices 106, and/or a gNB that provides 5G service to attached mobile devices 106, and/or any future type of node associated with any future IP-based network technology or evolution of an existing IP-based network technology. When a mobile device 106 is attached to a cell 104 to access a mobile/cellular network (e.g., to establish a voice-based communication session, a data-based communication session, etc.), the cell 104 providing the mobile device 106 with the access to the mobile/cellular network at the given moment is referred to as the "serving cell" 104.

In general, users of the mobile devices 106 shown in FIG. 1 may have subscribed to services that a carrier (or cellular network operator) provides to its customers. Such a carrier may utilize the cellular network (sometimes referred to herein as a "telecommunications network" or "mobile network") for delivering IP multimedia to the mobile devices 106 of its customers. For example, a service provider may offer multimedia telephony services that allow a subscribed user to call or message other users via the cellular network using his/her mobile device 106. A user can also utilize an associated mobile device 106 to receive, provide, or otherwise interact with various different services by accessing a core network via various network nodes. In this manner, a carrier may offer any type of service(s) (e.g., IMS-based services), such as telephony services (or voice calling), emergency services (e.g., E911), gaming services, instant messaging services, presence services, audio/video streaming services, video conferencing services, AR and/or VR services, social networking and sharing services, location-based services, push-to-talk services, WiFi calling services, real time text (RTT) services, RTT calling services and/or video calling services, and so on. In order to access one or more of these services, a mobile device 106 is configured to complete a registration procedure and thereafter request establishment of a communication session via a serving cell 104.

As the mobile devices 106 are carried by users between various geolocations, and as the mobile devices 106 are used to access the services described herein (e.g., to conduct communication sessions, such as phone calls) over a mobile network, client applications installed on the mobile devices 106 may be triggered at instances to collect data samples 108, temporarily store the collected samples in device storage, and send data samples 108 to a remote system 110. The mobile devices 106 may communicate with or send collected data samples to the remote system 110 (sometimes referred to herein as "computing system 110," or "remote computing system 110") at any suitable time and/or over any suitable computer network including, without limitation, the Internet, other types of data and/or voice networks, a wired infrastructure (e.g., coaxial cable, fiber optic cable, etc.), a wireless infrastructure (e.g., RF, cellular, satellite, etc.), and/or other connection technologies. In some embodiments, collected data samples 108 may be sent to the remote system 110 on a pre-set schedule or during a predetermined time period (e.g. on a daily basis) and/or whenever a data connection becoming available. In order to conserve resources (e.g., power resources, such as battery of the mobile device 106, network bandwidth, such as during a high-traffic period, etc.), data samples 108 can be scheduled to be sent to the remote system 110 at a relatively infrequent basis (e.g., daily, weekly, etc.). The remote system 110 may, in some instances be part of a network-accessible computing platform that is maintained and accessible via a computer network, and the remote system 110 may represent a plurality of data centers distributed over a geographical area, such as the geographical area 102. Network-accessible computing platforms such as this may be referred to using terms such as "on-demand computing", "software as a service (SaaS)", "platform computing", "network-accessible platform", "cloud services", "data centers", and so forth It is to be appreciated that various events may trigger the client application running on a mobile device 106 to collect a data sample 108. For example, a client application running on the mobile device 106(1) may collect a data sample 108 at the start of a communication session (e.g., during setup). Additionally, or alternatively, the client application may collect a data sample 108 at the end of a communication (e.g., during teardown). Other suitable triggering events or combination of events may be utilized as well. The client application running on a mobile device 106 may temporarily store collected data samples 108 in local memory of the mobile device 106 until a later point in time when one or more of the collected data samples 108 are sent to the remote system 110. For example, all data samples 108 collected during a period of time (e.g. one day) can be sent to the remote system 110 at a scheduled time and/or when a data connection becomes available to the mobile device 106.

The data samples 108 sent from the mobile devices 106 to the remote system 110 may include, various network metrics 112 including, without limitation, a Channel Quality Indicator (CQI) value, a geolocation, a signal strength of a radio signal from the serving cell 104, as measured by the mobile device 106 (e.g., a reference signal received power (RSRP) parameter, and/or a reference signal received quality (RSRQ) parameter), a signal-to-noise ratio (SNR) associated with the radio signal from the serving cell 104, a time (or timestamp) corresponding to a time at which the data sample 108 was collected, a device type (e.g., make, model, etc.) of the mobile device 106, a WiFi status (e.g., "on" or "off") indicating whether the mobile device 106 was using a WiFi capability at a time at which the data sample 108 was collected, and the like. These are merely example network metrics 112 that may be included in a data sample 108, and a given data sample 108 may include one or more of the enumerated network metrics 112, or additional network metrics 112 known to a person of ordinary skill in the art.

The CQI value included in the network metrics 112 may convey information indicative of a transmission data rate (e.g., a downlink transmission data rate) at a certain time and at a certain geolocation of the mobile device 106. The CQI value may comprise a 4-bit integer, and may be within a range of values (e.g., from 0 to 15). The CQI value may be determined based on an estimation, by the mobile device 106, of the channel quality using a cell-specific reference signal (e.g., a downlink cell-specific reference signal). In some embodiments, the mobile device 106 may determine (e.g., measure) one or more of the following channel parameters including, without limitation, a signal-to-interference and noise ratio (SINR), a SNR, a signal-to-noise plus distortion ration (SNDR), a power of the received signal, data rate, modulation and/or coding rate, throughput, bit error rate (BER), block error rate (BLER), packet error rate (PER), etc., and the mobile device 106 may determine (e.g., look up) a corresponding value of the CQI parameter that corresponds to the determined (e.g., measured) channel parameter(s). In some embodiments, the mobile device 106 may report an indicator of the quality of the channel to the cell 104 at every Transmission Time Interval (TTI), and the cell 104 may determine a modulation and code rate that results in a block error rate no greater than about 10%, and hence downlink data transmission rate to some extents from cell 104 to the mobile device 106. A higher value of the CQI parameter can mean that high-demand types of services (e.g., gaming, video streaming, etc.) may be supported, while a lower value of the CQI parameter can mean that low-demand types of services (e.g., basic data, emergency, etc.) may be supported.

The geolocation included in the network metrics 112 may specify, or may be used to derive, a latitude and longitude of the mobile device 106 at a time at which the data sample 108 was collected. In some embodiments, the geolocation may comprise a global positioning system (GPS) location. In some embodiments, the geolocation may comprise an Internet Protocol (IP) address of the mobile device 106 that is usable to derive, or estimate, a latitude and longitude of the mobile device 106. In some embodiments, the geolocation may comprise a cell identifier (ID) that identifies the serving cell 104, and which may be used to derive, or estimate, a latitude and longitude of the mobile device 106. In some embodiments, the geolocation may include additional data besides latitude and longitude, such as elevation (or height), accuracy of the geolocation, and, in some cases, a current speed (or velocity) at which the mobile device 106 is traveling (or moving).

Over time, the plurality of mobile device 106, as they are used to conduct communication sessions, may send data samples 108 to the remote system 110 as part of a crowd-sourcing approach. In this crowdsourcing example, the remote system 110 may aggregate the collected data samples 108 from multiple mobile devices 106, and may use the aggregated data samples 108 to create a network speed map. The process 100 is an example process that may be implemented to create a network speed map based on crowd-sourced data samples 108.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

At block 114 of the process 100, the remote system 110 (e.g., one or more server computers) may receive, from a plurality of mobile devices 106 within a geographical area 102, a plurality of data samples 108, each data sample 108 including a CQI value and a geolocation. In some embodiments, the data samples 108 received at block 114 may include additional network metrics 112, as described herein.

It is to be appreciated that multiple data samples 108 per mobile device 106 may be received at block 114. For example, the mobile device 106(1) may be used to make multiple phone calls at a particular geolocation. Each phone call is made by the mobile device 106(1) at a different time. In this example, the remote system 110 may collect two data samples 108 per phone call. One data sample 108 received at block 114 may be collected when the call is started, and another data sample 108 received at block 114 may be collected when the call is ended. Accordingly, a mobile device 106 that is used to make five phone calls may result in as many as ten data samples 108 from the mobile device 106. Furthermore, it is to be appreciated that the data samples may be received (or collected) at block 114 continuously and iteratively (e.g., daily collection of data samples 108, month after month).

At 116, the remote system 110 may select a subset of data samples 108 that specify geolocations within a bin within the geographical area 102. As described herein, the remote system 110 may define bins of any suitable shape and size to provide network speed information at any suitable resolution within the geographical area 102. For example, a bin may be defined by a centroid geolocation, a shape (e.g., hexagonal, square, rectangular, triangular, circular, or any other suitable two-dimensional polygon), and a size (e.g., an area (or footprint) of an individual bin may be about 100 square meters). Thus, if a latitude and longitude of a geolocation specified in a data sample 108 is within the boundary of a given bin, the data sample 108 may be selected at block 116 for that bin.

Furthermore, a time window may be utilized at block 116 to select the subset of data samples 108. For example, data samples 108 received over the past month may be selected at block 116, although a month is merely an exemplary time window, and any suitable time window (or time period) may be utilized (e.g., a week, multiple weeks, etc.). For example, the subset of data samples 108 may be selected at block 116 over a time window that is at least one of multiple weeks or a month.

In some embodiments, if the number of available data samples 108 for a given bin is below a threshold number, that bin is removed from consideration in the process 100 of generating the network speed map, as there may not be enough data available in that bin to make an accurate determination of network speed (e.g., download speed). Accordingly, for purposes of the discussion of the process 100, the selection of the subset of data samples 108 at block 116 may include determining that the number data samples 108 in the subset satisfies a threshold number of data samples. As used herein, a value can "satisfy" a threshold value if the value is equal to or greater than the threshold value, or if the value is strictly greater than the threshold value. Accordingly, a value can "fail to satisfy" a threshold value if the value is less than or equal to the threshold value, or if the value is strictly less than the threshold value. To mitigate a lack of sufficient data, data samples 108 may be accumulated over a longer time frame (or duration), and a sufficiently-long time window may be utilized to select the subset of data samples 108 at block 116. Although a longer time window may provide more data, and, hence, a higher density of information in the network speed map, there is a tradeoff between making more data available using a longer time window and using data that is not stale (i.e., too old to be considered valid data). This is because network operators continually change and improve their network topology, which means that a download speed of a mobile network at a given geolocation one year ago may be different than the download speed of the mobile network at the same geolocation today.

At 118, the remote system 110 may determine, for the subset of data samples 108 that specify geolocations within the bin within the geographical area 102, efficiency values that correspond to CQI values specified in the subset of data samples 108. Two example CQI tables that may be used at block 118 are shown below:

TABLE 1

| CQI Index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

| CQI Index | modulation | code rate x 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

Table 1 may be used for the determination at block 118 if a wireless carrier's mobile network does not support a modulation of 256QAM. Otherwise, Table 2 may be used for the determination at block 118 if a wireless carrier's mobile network supports a modulation of 256QAM. Whichever table is utilized, the determination at block 118 may involve looking up, for each CQI value specified in each data sample 108, a corresponding efficiency value in the rightmost column of the table (e.g., Table 1 or Table 2). In an illustrative example, if a data sample 108 specifies a CQI value of 6, and if Table 1 is used as the CQI table, a corresponding efficiency value determined at block 118 may be an efficiency value of 1.1758. This may be done for all data samples 108 within a given bin to determine multiple efficiency values.

At 120, the remote system 110 may determine a spectrum efficiency value associated with the selected bin based at least in part on the efficiency values determined at block 118. In some embodiments, the spectrum efficiency value may be calculated as an average of the efficiency values determined at block 118. It is to be appreciated, however, that other statistical calculations may be used to determine a spectrum efficiency value at block 120 (e.g., median, mode, etc.). The spectrum efficiency value determined (or calculated) at block 120 may be expressed as a number of bits per resource element (RE).

At 122, the remote system 110 may estimate a data rate associated with the bin based at least in part on the spectrum efficiency value determined (or calculated) at block 120. This data rate (sometimes referred to as a "network speed") may comprise a download speed (or download speed value/estimate). In some embodiments, the data rate may comprise an upload speed (or upload speed value/estimate). In some embodiments, the data rate (e.g., download speed) may be estimated at block 122 based on a total number of resource elements (REs) in a subframe, and based on an overhead value, as will be described in more detail below with reference to FIG. 5.

At 124, as part of creating a network speed map over a geographical area (e.g., the entire geographical area 102) that contains multiple bins, if there are more bins for which a data rate has not yet been estimated, the process 100 may follow the YES route from block 124 back to block 116 where another subset of data samples 108 specifying geo-locations within another bin may be selected, and blocks 116-122 may iterate for multiple bins within the geographical area. If, at block 124, there are no more bins within the geographical area to evaluate, the process 100 may follow the NO route from block 124 to block 126, where the remote system 110 may generate (or create) a network speed map of the geographical area that includes the evaluated bin(s). For example, generating the network speed map at block 126 may involve associating the estimated data rate(s) (e.g., download speed(s)) with the bin(s) (and/or with geolocations within the bin(s)) contained within a geographical area, such as the geographical area 102.

Figure 2:
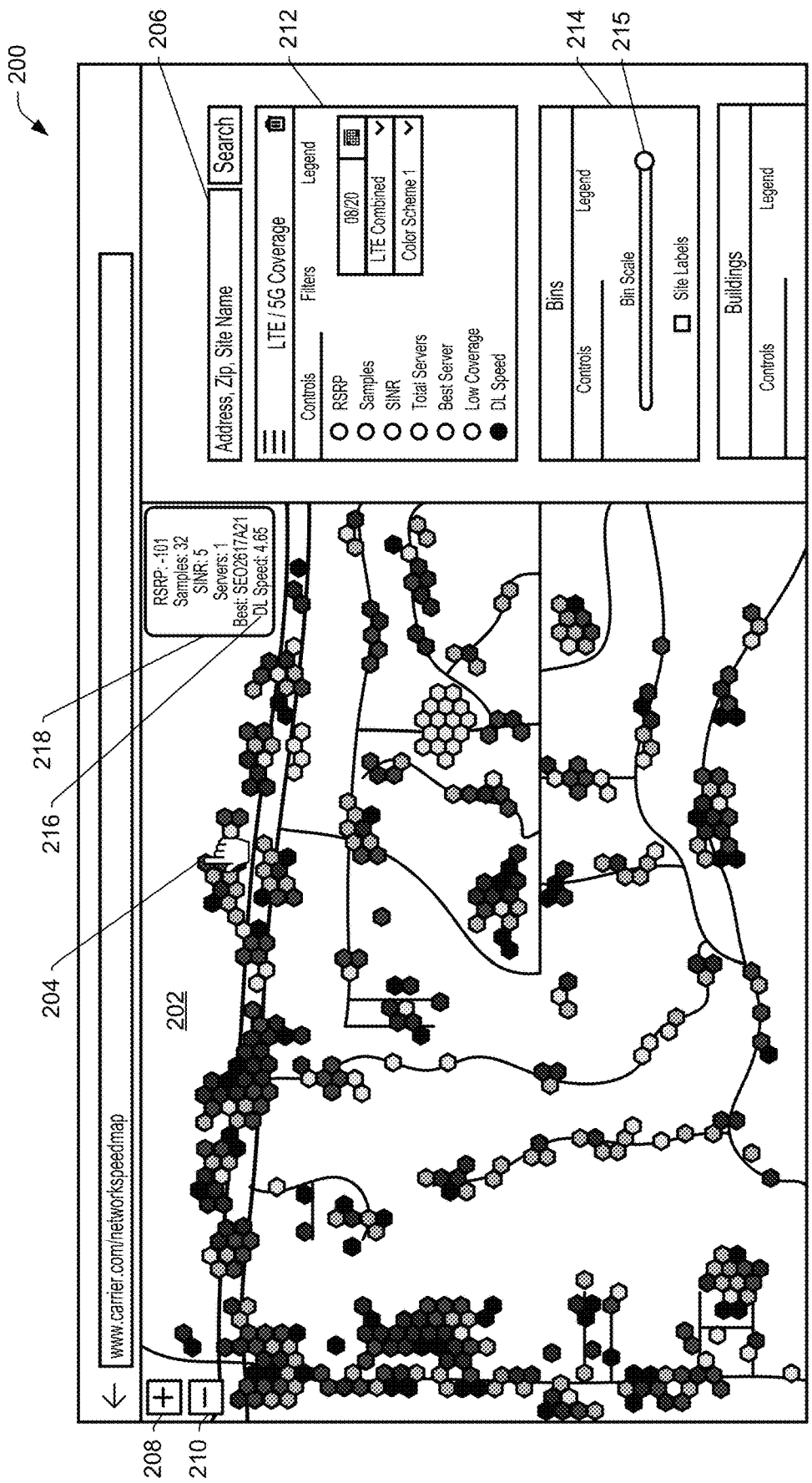
FIG. 2 illustrates an example network speed map for a geographical area presented in a user interface with multiple selectable bins presented within the geographical area, in accordance with various embodiments.

FIG. 2 illustrates an example network speed map for a geographical area 202 presented in a user interface 200 with multiple selectable bins 204 presented within the geographical area 202, in accordance with various embodiments. The example user interface 200 is shown, by way of example, as a web browser where a user may have entered a Uniform Resource Locator (URL) address to navigate to an online network speed map for a geographical area 202. It is to be appreciated, however, that the user interface 200 may additionally, or alternatively, be presented on a display of a user computing device via a client application (or mobile application).

In some embodiments, the geographical area 202 that is presented via the user interface 200 may be selected based at least in part on location data indicating a current location of a user computing device on which the network speed map is presented. For example, a user computing device presenting the network speed map may comprise the mobile device 106(1), shown in FIG. 1. When a user invokes a web browser or a mobile application to present the network speed map shown in FIG. 2, the remote system 110 may receive location data from the mobile device 106(1) (e.g. a GPS location, an IP address, etc.), and the remote system 110 may select the geographical area 202 that includes (e.g., that is centered around) the current location of the mobile device 106(1) indicated by the received location data. A user may provide authorization for the remote system 110 to use their current location for generating a network speed map in this manner. Additionally, or alternatively, the user may enter location data (e.g., an address, zip code, site name, etc.) into a search field 206 to have the geographical area 202 surfaced in the network speed map.

The user interface 200 may include a zoom-in control 208 (or user interface element) and a zoom-out control 210 (or user interface element) that, upon selection by the user, may zoom into a smaller geographical area, or may zoom out to a larger geographical area, as the case may be. The user may also use a pinch gesture on a touch screen to zoom out, and a spread gesture on the touch screen to zoom in. Furthermore, the user may touch (or click with a mouse pointer) and drag the geographical area 202 of the user interface 202 in order to pan the map left, right, up, and/or down within the user interface 200.

In addition to the search field 206, a portion of the user interface 200 may include one or more other control panes or windows that include interactive user interface elements to vary parameters of the network speed map. For example, a first control pane 212 may include information about the type of mobile network that is presented in the network speed map (e.g., LTE/5G, indicating that a mobile network provides both types of coverage), as well as one or more selectable radio buttons under a "Controls" heading that the user can select to include desired information in the network speed map. In the example user interface 200, a user has selected the "DL Speed" radio button ("DL" meaning download) in the first control pane 212 to indicate that the user would like to see the download speeds that have been estimated for bins 204 the geographical area 202.

A second control pane 214 may allow the user to vary parameters relating to the bins 204 that are presented within the geographical area 202 of the network speed map. For example, the user can vary the size of the individual bins 204 using a slider control 215. That is, the user may move the slider control 215 within the second control pane 214 in the leftward direction to decrease the size of the bins 204, or move the slider control 215 within the second control pane 214 in the rightward direction to increase the size of the bins 204. This, in turn, provides network speed (e.g., download speed) information at higher or lower resolutions, respectively.

The network speed map may be presented by causing the geographical area 202 to be presented in the user interface 200 with multiple selectable bins 204 presented within the geographical area 202. The example bins 204 in FIG. 2 are hexagonal, but any suitable shape can be used for the bins 204. Portions of the geographical area 202 that do not have any bins 204 may omit bins due to an insufficient amount of data available in those portions of the geographical area 202. For example, the portions of the geographical area 202 that are devoid of bins 204 may be areas that are impassible by humans (e.g., a body of water, rugged terrain, etc.), or may simply be areas where humans with mobile devices 106 seldom visit. For this reason, the bins 204 tend to be clustered around roadways and other walking or driving paths/areas, because users often travel with their mobile devices 206 along roads and sidewalks while walking, biking, or driving in cars.

If the user selects (e.g., touches with a finger on a touch screen, selects with a mouse/pointer, etc.) a bin 204, the user computing device that is presenting the user interface 200 may detect such user input and send to the remote system 110 an indication that the bin 204 has been selected on the user computing device via the user interface 200. In response, the remote system 110 may present a data rate (e.g., a download speed 216) associated with the selected bin 204 within a pop-up window 218 on the user interface 200. In the example of FIG. 2, the user has selected (e.g., clicked on) a bin 204 within the user interface that is associated with a download speed of 4.65 Mbps. This data rate metric, in the form of a download speed 216, may be estimated using the process 100, as described herein, and it may be associated with a particular network bandwidth, such as 5 Megahertz (MHz). In some embodiments, the user may be able to select different network bandwidths, such as 10 MHz, 15 MHz, 20 MHz, etc. via a control pane of the user interface 200, which may cause the network speed map to update the download speed 216 in accordance with various different network bandwidths.

The example of FIG. 2 shows a network speed map that presents selectable bins 204 with different color gradients to provide a visual indication of variable data rates across the geographical area 202. In this example, a bin 204 with a darker color may indicate a faster data rate (e.g., download speed), while a bin 204 with a lighter color may indicate a slower data rate (e.g., download speed), or vice versa. It is to be appreciated that other types of visual indicators may be utilized in the network speed map, such as different patterns, different sizes of bins, etc., in order to indicate different data rates (e.g. download speeds 216). In any case, the visual indicators in the form of bins 204 with different color gradients may provide a quick and easy way for a user to understand the variability of data rates (e.g., download speeds) provided by a mobile network across a given geographical area 202.

Figure 3:
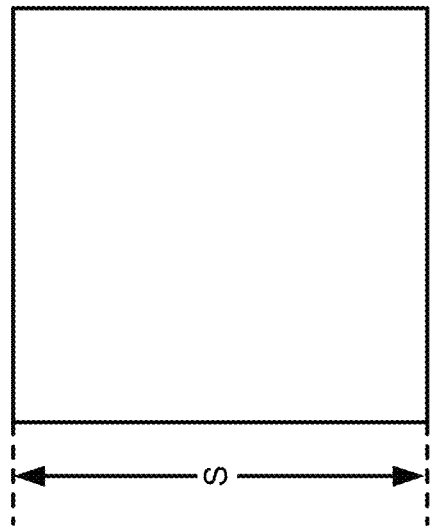
FIG. 3 illustrates two example bin shapes that can be implemented with a network speed map, in accordance with various embodiments.
Figure 3:
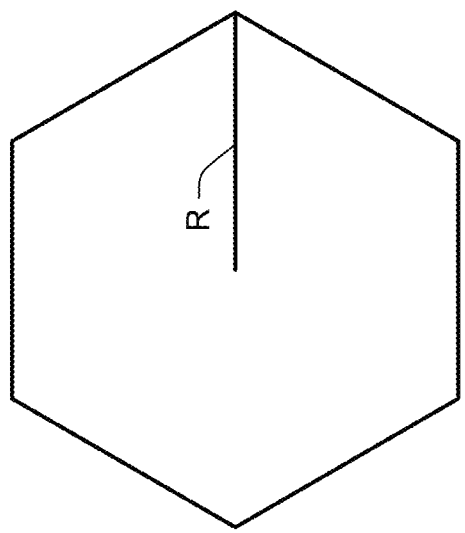

FIG. 3 illustrates two example bin shapes that can be implemented with a network speed map, in accordance with various embodiments. A hexagonal bin 204(A) is shown in FIG. 3 as having a hexagonal shape. The network speed map shown in the user interface 200 of FIG. 2 illustrates an example that utilizes the hexagonal bin 204(A) because each bin 204 in the network speed map of FIG. 2 is a hexagon. The hexagonal bin 204(A) has a radius, R, which may be no greater than about 10 meters, in some embodiments. A square bin 204(B) is also shown in FIG. 3 as having a square shape. A network speed map can utilize the square bin 204(B) in some embodiments. The square bin 204(B) has a side, S, which may be no greater than about 10 meters, in some embodiments. Accordingly, the area (or footprint) of an individual bin 204 may be no greater than about 100 square meters, in some embodiments, to provide a suitably-high resolution of network speeds for a network speed map. It is to be appreciated that other bin shapes are contemplated, such as rectangular, triangular, circular, or any other suitable two-dimensional polygon. It is also to be appreciated that other bin sizes are contemplated, such as a square with a side, S, or a hexagon with a radius, R, of 5 meters, 100 meters, or any suitable size, and it is to be appreciated that this size may be dynamically varied by the user via control elements of the user interface 200 shown in FIG. 2, such as by manipulating the slider control 215 in the second control pane 214 of the user interface 200.

Figure 4:
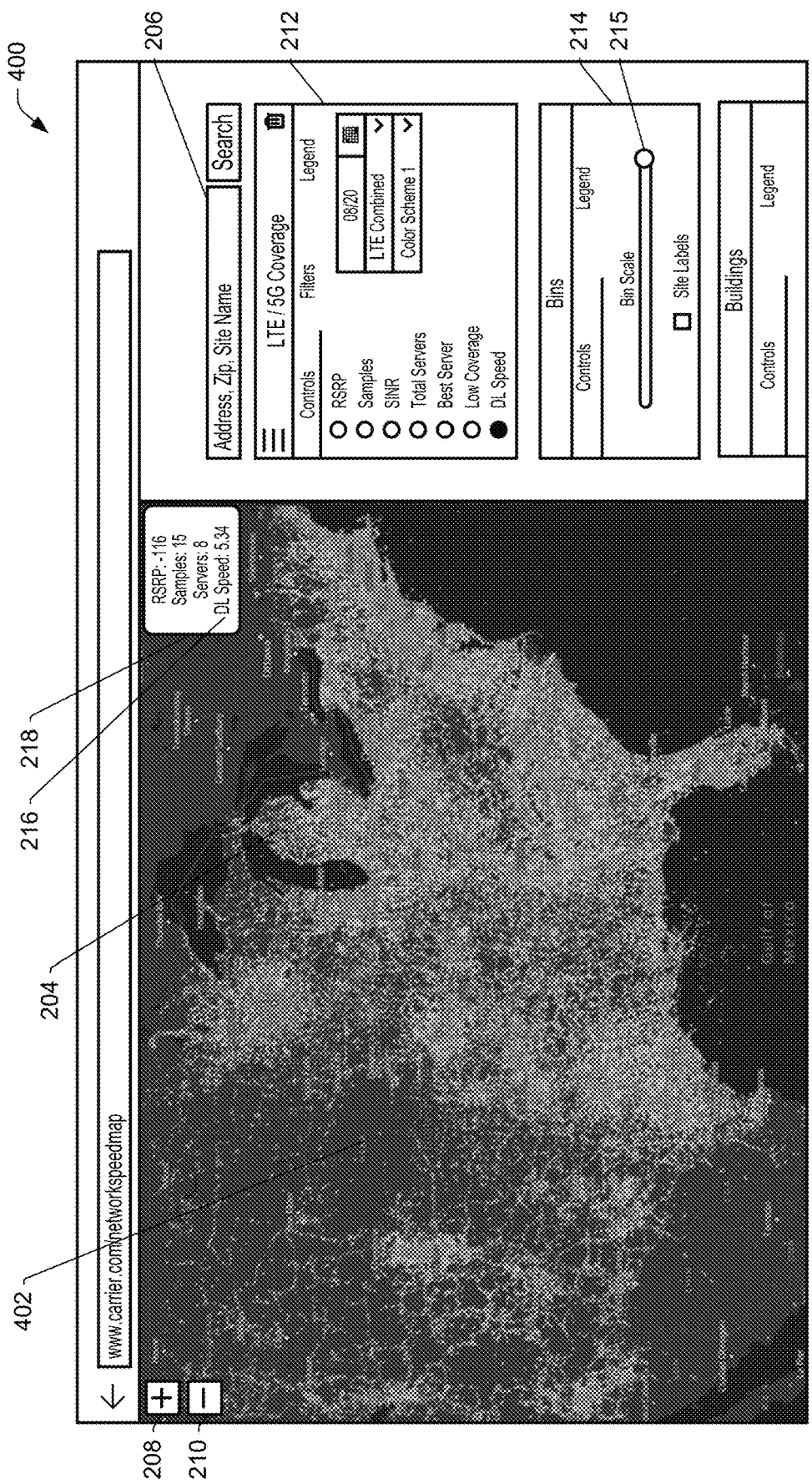
FIG. 4 illustrates an example nationwide network speed map for the contiguous United States of America, the network speed map presented in a user interface with multiple selectable bins, in accordance with various embodiments.

FIG. 4 illustrates an example nationwide network speed map for the contiguous United States of America, the network speed map presented in a user interface 400 with multiple selectable bins 204, in accordance with various embodiments. The user interface 400 depicted in FIG. 4 may be a presented on a display of a user computing device in response to the user zooming out (e.g., using the zoom-out control 210, a pinch gesture on a touch screen, etc.) to a zoomed-out view of a larger geographical area 402, as compared to the relatively smaller geographical area 202 shown in the user interface 200 of FIG. 2. That is, FIG. 4 illustrates how a user may interactively manipulate the zoom level (among other variables) of the network speed map to obtain a different viewpoint of the network speeds (e.g., download speeds) at various geographical locations, at different levels of granularity. The color gradients of the bins 204 in the network speed map of FIG. 4 may be a quick and easy way for the user to understand where network speeds (e.g., download speeds are better/faster, and where download speeds are worse/slower) at a nationwide level. In this manner, a user can plan a trip and be better prepared for the expected network speeds (e.g., download speeds) provided by a mobile network along a travel route. A network operator can see the distribution of network speeds (e.g., download speeds) across their service territory and use this information to better plan for network topology changes that can improve (or otherwise change) network speed performance of the mobile network in certain geographical areas. A customer care department can troubleshoot issues faster and more efficiently for mobile network customers, as described herein. These are just a few example benefits of the network speed map described herein.

Figure 5:
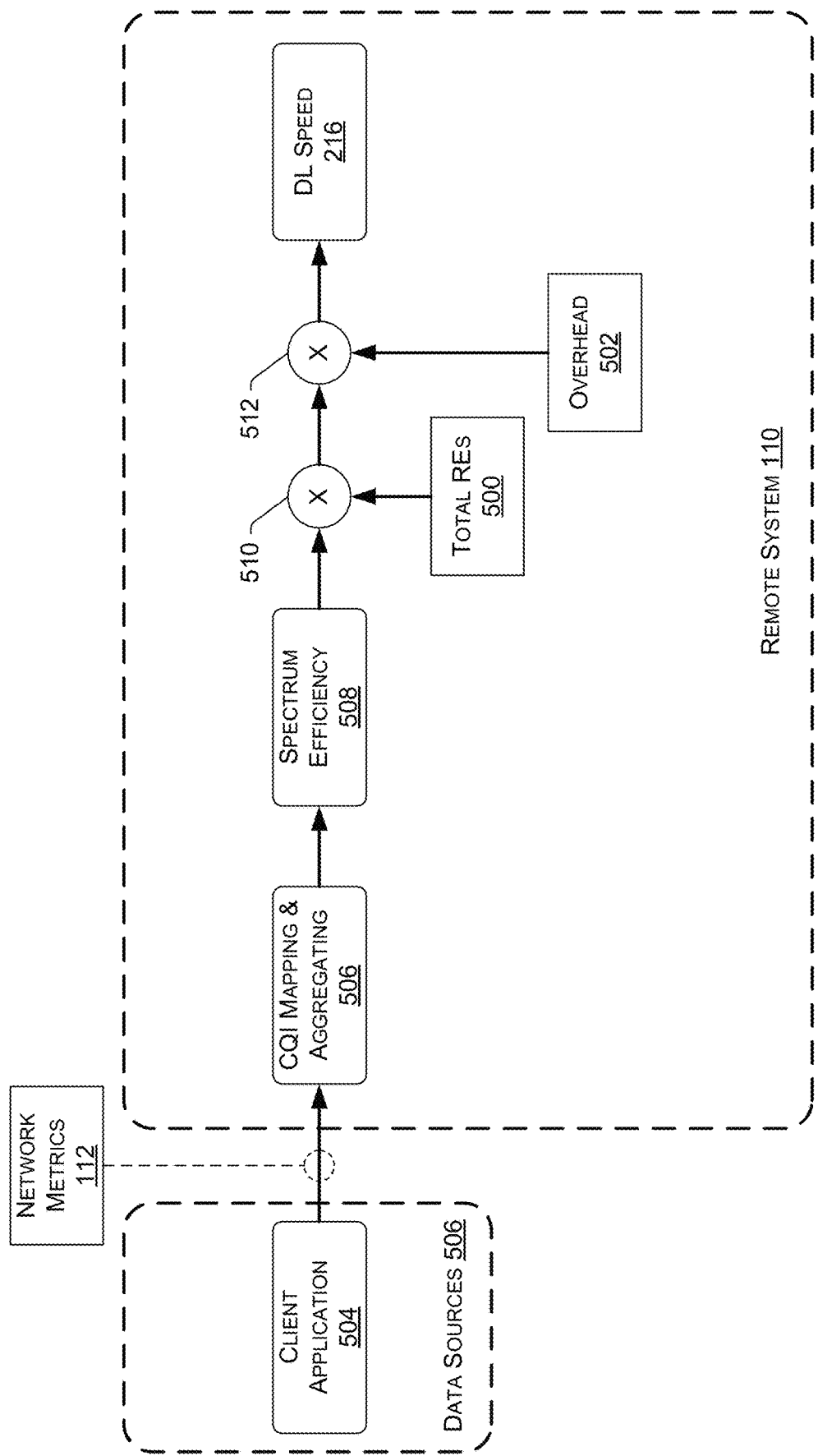
FIG. 5 illustrates a block diagram of an example technique for estimating a download speed(s) associated with a bin(s) of a network speed map based on crowd-sourced data samples, in accordance with various embodiments.

FIG. 5 illustrates a block diagram of an example technique for estimating a download speed(s) 216 associated with a bin(s) 204 of a network speed map based on crowd-sourced data samples 108, in accordance with various embodiments. FIG. 5 illustrates a client application 504, which may be installed on, and executed by, one or more data sources 506. The mobile devices 206 depicted in FIG. 1 are examples of data sources 506 that may install and run the client application 504 thereon. The client application 504 is configured to determine network metrics 112, collect data samples 108 in response to triggering events (e.g., at the start of a communication session, at the end of a communication session, etc.), store the collected data samples 108 in memory of the device 106, and send (e.g., at a later time) those network metrics 112 as data samples 108 to the remote system 110.

The remote system 110 may receive (e.g., collect) the network metrics 112 via data samples 108 from the data sources 506, and may perform CQI mapping and aggregating at block 506. For example, the aggregating at block 506 may be performed as part of the operations at block 116 of the process 100, where the remote system 110 may select subsets of data samples 108 that specify geolocations within specific bins 204 within the geographical area, and may group the data samples 108 into bins 204 based on the geolocations. In other words, the aggregating performed at block 506 of FIG. 5 may involve using the geolocations received in the network metrics 112 to group data samples 108 into bins 204 of the network speed map. The number of samples 108 per bin 204 that results from the aggregating performed at block 506 may vary depending on how many users conduct communication sessions at geolocations within the defined bins 204, and how often they do so. For example, in a shopping mall, or in a similar crowded area, the remote system 110 may aggregate more samples 108 per bin 204. By contrast, in a remote, sparsely-populated area, the remote system 110 may aggregate fewer samples 108 per bin 204. There is a trade-off with the size (or scale) of the individual bins 204 in that bins that are too small may result in geolocations that are not very accurate, and the resulting data may be invalid. Bins that are too large, on the other hand, may result in data that is not meaningful (e.g., it is not very meaningful to estimate a single download speed value for the entire contiguous United States of America). Furthermore, the data samples 108 that are received by the remote system 110 may be received over a predetermined period of time that is at least one of multiple weeks, a month, or any other suitable period of time to ensure a sufficient number of data samples 108 are available.

The CQI mapping at block 506 may be performed as part of the operations at block 118 of the process 100, where the remote system 110 may determine, for individual subsets of data samples 108 that specify geolocations within respective bins 204, efficiency values that correspond to CQI values specified in the subsets of data samples 108. As described herein, a CQI table (e.g., Table 1 or Table 2 herein) may be accessed and utilized for the CQI mapping at block 506.

After block 506, the remote system 110 may determine a spectrum efficiency value at block 508, which may be performed as part of the operations at block 120 of the process 100. As noted above, in some embodiments, the spectrum efficiency value may be calculated at block 508 as an average of the efficiency values determined from the CQI mapping at block 506, but other statistical calculations (e.g., median, mode, etc.) may be used in addition, or in the alternative, to an average value calculation. The spectrum efficiency value determined (or calculated) at block 508 may be expressed as a number of bits per resource element (RE).

With the spectrum efficiency value determined at block 508, the remote system 110 may estimate a data rate (e.g., a download speed 216) based at least in part on the spectrum efficiency value, as well as a total number of resource elements (REs) 500 in a subframe, and an overhead value 502, as depicted in FIG. 5. For example, the remote system 110 may determine the total number of REs (block 500 in FIG. 5) in a subframe (which is 1 millisecond long and/or 2 slots wide in LTE) for a particular network bandwidth (e.g., 5 MHz, 10 MHz, 15 MHz, 20 MHz, etc.) based at least in part on a number of physical resource blocks (PRBs) associated with the particular network bandwidth and a number of subcarriers per PRB, and possibly also based on the number of orthogonal frequency-division multiple access (OFDMA) symbols (e.g., 7 symbols). In LTE, for instance, at a network bandwidth of 5 MHz, there are 25 PRBs (sometimes referred to herein as "resource blocks"). There are 50 PRBs at a network bandwidth of 10 MHz, 75 PRBs at a network bandwidth of 15 MHz, and 100 PRBs at a network bandwidth of 20 MHz. Each PRB is 12 subcarriers wide, which means that there are 12 subcarriers per PRB. In an illustrative example, Equation (1), below, can be used to determine (e.g., calculate) the total number of REs 500 in a subframe at a network bandwidth of 5 MHz (which has 25 PRBs):

$$12 \text{ Subcarriers} \times 7 \text{ OFDMA Symbols} \times 25 \text{ Resource Blocks} \times 2 \text{ slots} = 4{,}200 \text{ REs} \quad (1)$$

At junction 510 of FIG. 5, the total number of REs 500 may be multiplied by the spectrum efficiency value determined at block 508, and the resulting product represents a "raw" data rate (e.g., download speed) value. In an illustrative example, consider a spectrum efficiency value of 4 bits per RE. At junction 510, the remote system 110 may determine a product of the spectrum efficiency value (e.g., 4 bits per RE) and the total number of REs in a subframe (e.g., 4200), and may divide that number by 1000 milliseconds $$\left(\text{e.g.,} \frac{(4 \times 4200)}{1000}\right)$$

to obtain a raw data rate (e.g., download speed) value in Mbps (e.g., 16.8 Mbps).

Since the raw data rate (e.g., download speed) value includes data that is transmitted for control purposes and/or synchronization purposes, the remote system 110 may determine a percentage of data sent (e.g., in the downlink direction) that represents control data and/or synchronization data (i.e., overhead). In LTE, the overhead rate can be estimated at about 25%. In 5G, the overhead rate can be estimated at about 13%. The remote system 110 may then multiply the raw data rate (e.g., download speed) by this percentage to determine an overhead value 502. Continuing with the running example, if the raw data rate (e.g., download speed) value is determined (or calculated) to be 16.8 Mbps, and assuming an overhead rate of 25% in LTE, the resulting overhead value 502 is 4.2 Mbps.

At junction 512, the overhead value 502 (e.g., 4.2 Mbps) may be subtracted from the raw data rate (e.g., download speed) value (e.g., 16.8 Mbps) to obtain the data rate (e.g., download speed 216) associated with the given bin. In the running example, by subtracting the overhead value of 4.2 Mbps from the raw data rate (e.g., download speed) of 16.8 Mbps, an estimated data rate (e.g., download speed 216) of 12.6 Mbps is obtained. In an alternative way, the remote system 110 may then multiply the raw data rate (e.g., download speed) of 16.8 Mbps by (1−overhead rate of 25% (or 0.25)) to obtain the estimated data rate (e.g., download speed 216) of 12.6 Mbps associated with the given bin. To calculate a multiple input, multiple output (MIMO) data rate (e.g., download speed 216) estimate, this result (e.g., 12.6 Mbps) can be doubled (e.g., a 25.2 Mbps MIMO data rate).

The techniques described with reference to FIG. 5 to determine a data rate (e.g., download speed 216) may be performed as part of the operations at block 122 of the process 100 for estimating the data rate (e.g., download speed 216) for a given bin 204. This can also be iterated for multiple bins 204 to obtain estimates of data rates (e.g., download speeds) for multiple bins 204 within a geographical area, as described herein.

Figure 6:
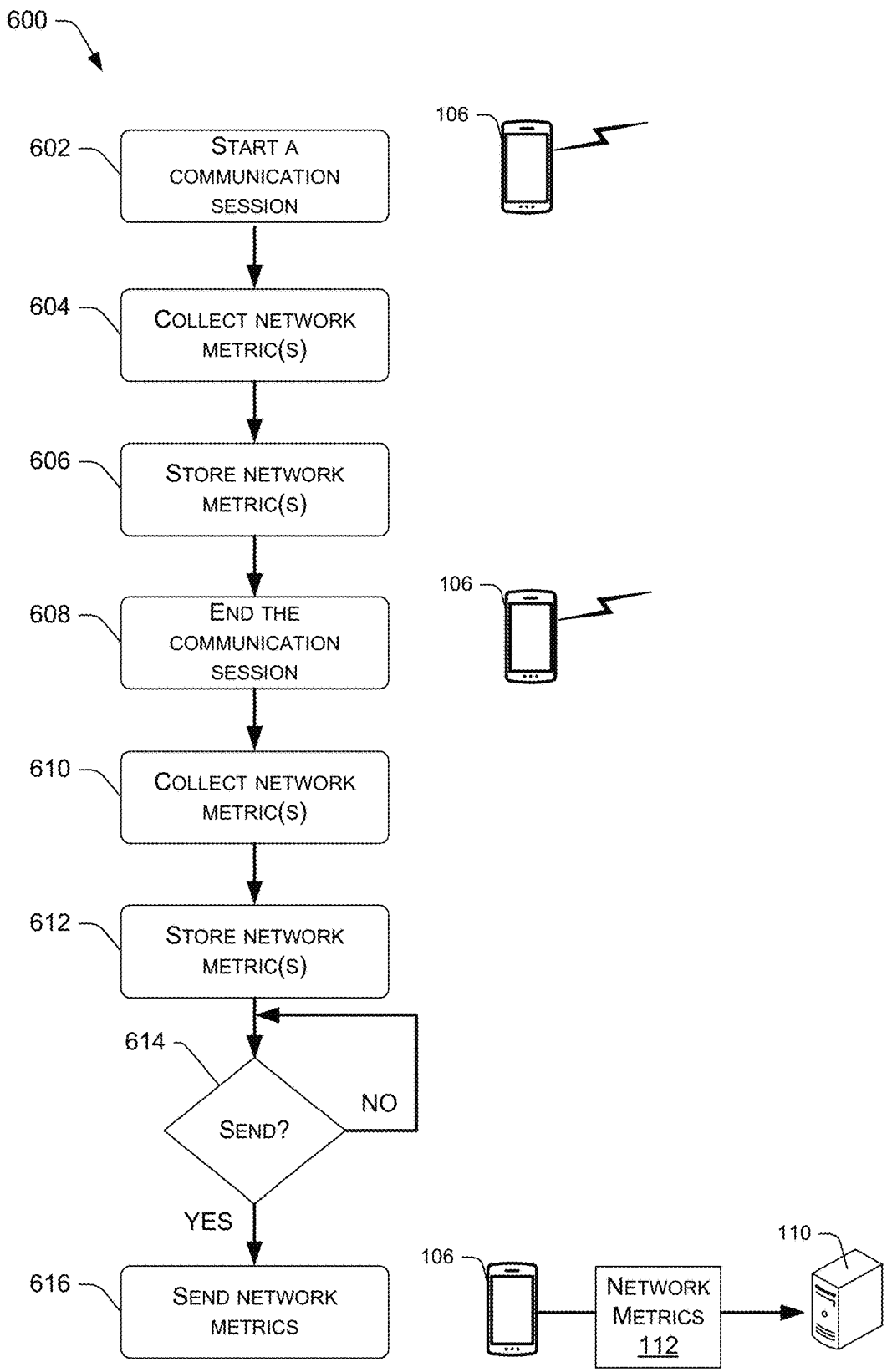
FIG. 6 illustrates a flowchart of an example process implemented by a mobile device for sending network metrics to a remote system, in accordance with various embodiments.

FIG. 6 illustrates a flowchart of an example process 600 implemented by a mobile device 106 for sending network metrics 112 to a remote system 110, in accordance with various embodiments. For discussion purposes, reference is made to the previous figures in describing the process 600.

At 602, the mobile device 106 may start a communication session. For example, the mobile device 106 may begin setting up a communication session (e.g., a phone call, such as a VoLTE call, VoNR call, etc.). This may include the mobile device 106 sending a Session Initiation Protocol (SIP) request using the SIP INVITE method to request establishment of a communication session. It is to be appreciated that a communication session may comprise any data connection session such as, without limitation, accessing a website, texting, gaming, streaming audio and/or video, downloading/uploading data (e.g., a file), and so on.

At 604, the mobile device 106, based at least in part on starting the communication session at 602, may collect one or more network metrics 112 as part of, or to include in, a data sample 108, as described herein. In other words, the starting of the communication session at block 602 may act as a triggering event for the client application 504 running on the mobile device 106 to collect a data sample 108 including the network metric(s) 112. When triggered, the client application 504 running on the mobile device 106 may query the network metrics 112 via available interfaces provided by mobile device operating system (OS).

At 606, the client application 504 running on the mobile device 106 may store the collected data sample 108 including the network metric(s) 112 in memory or storage of the mobile device 106. The storage of the data sample 108 including the network metric(s) 112 may be temporary in the sense that the data sample 108 is to be deleted once the data sample 108 is sent to a remote system 110.

At 608, the mobile device 106 may end the communication session. For example, the mobile device 106 may start tearing down a communication session (e.g., a phone call, such as a VoLTE call, VoNR call, etc.). This may include the mobile device 106 sending a SIP request to terminate the communication session in response to a user hanging up a phone call, for example.

At 610, the mobile device 106, based at least in part on ending the communication session at 608, may collect one or more network metrics 112 as part of, or to include in, another data sample 108, as described herein. In other words, the ending of the communication session at block 608 may act as a triggering event for the client application 504 running on the mobile device 106 to collect a data sample 108 including the network metric(s) 112. When triggered, the client application 504 running on the mobile device 106 may query the network metrics 112 via available interfaces provided by mobile device OS.

At 612, the client application 504 running on the mobile device 106 may store the additional collected data sample 108 including the network metric(s) 112 in memory or storage of the mobile device 106. Again, the storage of the data sample 108 including the network metric(s) 112 at block 612 may be temporary in the sense that the additional data sample 108 is to be deleted once the additional data sample 108 is sent to a remote system 110.

At 614, a determination may be made as to whether to send collected data samples 108 to a remote system 110. For example, the determination at block 614 may involve determining whether current time is a pre-set or scheduled time to send collected data samples 108. As another example, the determination at block 614 may involve determining whether a data connection has become available (e.g., the mobile device 106 connects to a WiFi network, to a cell 104, etc.). If it is determined to send collected data samples 108, the process 600 may follow the YES route from block 614 to block 616.

At 616, the mobile device 106 may send one or more network metrics 112 to a remote system 110 as part of a data sample(s) 108, as described herein. For example, the mobile device 106 may send all data samples 108 collected over a time period since sending a last set of one or more data samples 108 to the remote system 110. As described herein, these network metrics 112 may include, without limitation, a CQI value and a geolocation.

If it is determined not to send collected data samples 108, the process 600 may follow the NO route to iterate the determination at block 614 until it is determined to send the data sample(s) 108 to the remote system 110. For example, the mobile device 106 may wait until a scheduled time to send the data sample(s) 108 and/or may refrain from sending the data sample(s) 108 until a data connection becomes available.

Figure 7:
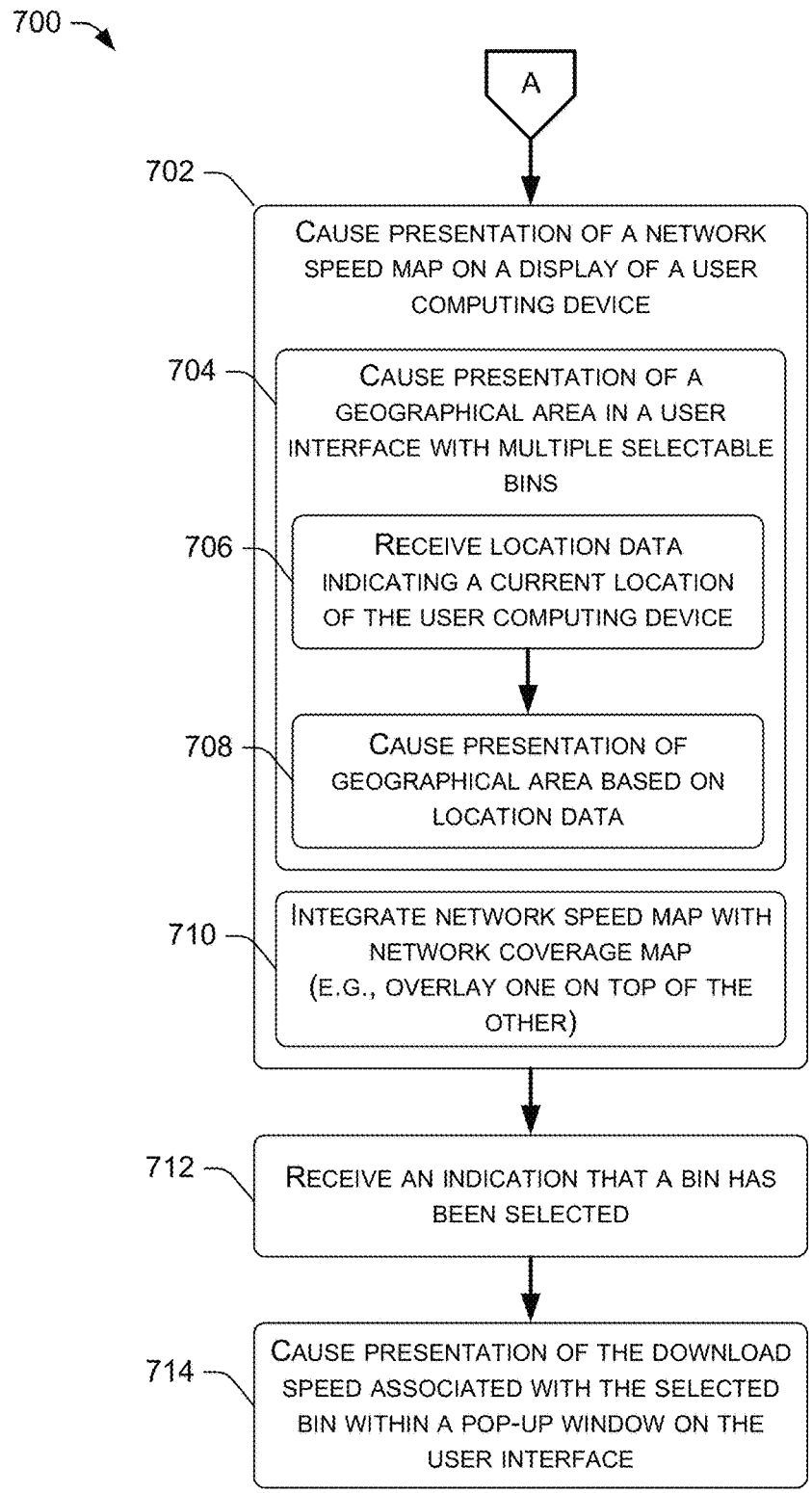
FIG. 7 illustrates a flowchart of an example process for causing presentation of an interactive network speed map on a user computing device, in accordance with various embodiments.

FIG. 7 illustrates a flowchart of an example process 700 for causing presentation of an interactive network speed map on a user computing device, in accordance with various embodiments. For discussion purposes, reference is made to the previous figures in describing the process 700. Furthermore, as indicated by the off-page reference "A" in FIGS. 1 and 7, the process 700 may continue from block 126 of the process 100, after a network speed map has been generated (or created).

At 702, a remote system 110 may cause presentation of the network speed map on a display of a user computing device. Exemplary depictions of such a network speed map are illustrated in FIGS. 2 and 4.

At sub-block 704, causing presentation of the network speed map may include causing presentation of a geographical area 202/402 in a user interface 200/400 with multiple selectable bins 204 presented within the geographical area 202/402. This may involve receiving, from the user computing device at sub-block 706, location data indicating a current location of the user computing device that is within the geographical area 202/402. In this example, the user computing device may be within a threshold distance of a bin 204 such that the bin 204 can be displayed within the geographical area 202/402 of the network speed map. At sub-block 708, the remote system 110 may cause presentation of the geographical area 202/402 on the display of the user computing device based at least in part on the location data received at sub-block 706, the geographical area 202/402 including the bin 204 that is within a threshold distance of the user computing device. It is to be appreciated, however, that this is one exemplary way of presenting a network speed map on a display of a user computing device, and that other ways, such as receiving user input specifying location data (e.g., an address, zip code, site name, etc.) within a search field 206 of the user interface 200/400, may be used to present an appropriate geographical area 202/402 of a network speed map.

At sub-block 710, the remote system 110 may cause presentation of the network speed map by integrating the network speed map with a network coverage map. For example, the network speed map may overlay a cellular network coverage map of the geographical area 202/402 in a user interface 200/400, or vice versa, thereby showing both coverage of a mobile network and network speed (e.g., download speed) of the mobile network in the same view.

At 712, the remote system 110 may receive an indication that a bin 204 has been selected on the user computing device. For example, a user may hover a mouse over, click on, touch, etc. a bin 204 presented in the geographical area 202/402, and the user computing device may send an indication of this user input action to the remote system 110.

At 714, based at least in part on the indication of the bin 204 being selected at block 712, the remote system 110 may cause presentation of an estimated data rate (e.g., download speed 216) associated with the bin 204 within a pop-up window 218 on the user interface 200/400. This pop-up window 218 may be persistently presented as the user selects different bins 204, and the data rate (e.g., download speed 216) in the pop-up window 218 may be updated in response to each selection of a different bin 204 in the network speed map.

Figure 8:
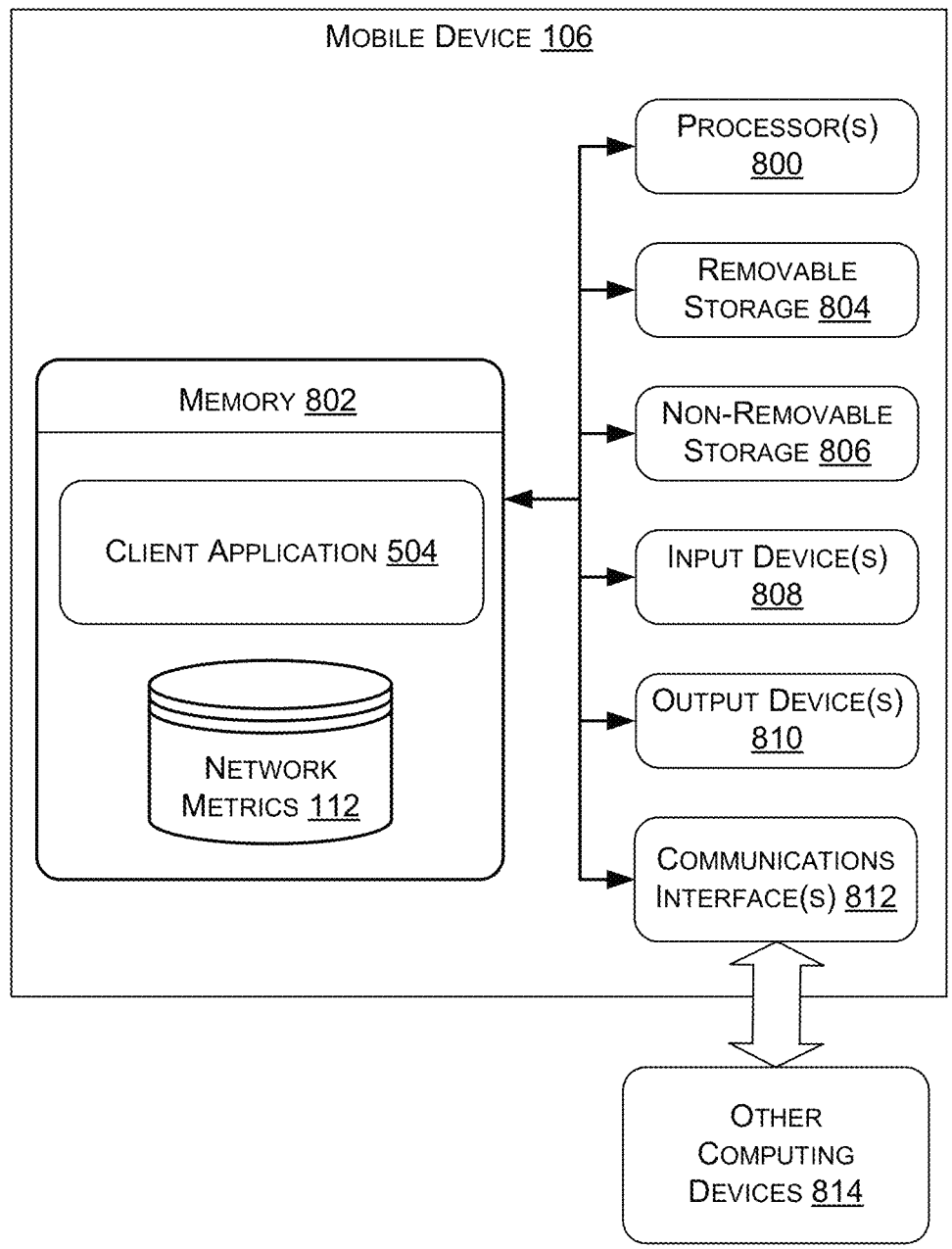
FIG. 8 is a block diagram of an example mobile device architecture, in accordance with various embodiments.

FIG. 8 is a block diagram of an example mobile device 106 architecture, in accordance with various embodiments. As shown, the mobile device 106 may include one or more processors 800 and one or more forms of computer-readable memory 802. The mobile device 106 may also include additional storage devices. Such additional storage may include removable storage 804 and/or non-removable storage 806.

In various embodiments, the computer-readable memory 802 is non-transitory and can include both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The non-transitory computer-readable memory 802 may also be described as computer storage media and may include volatile and nonvolatile, removable and non-removable media implemented in any method or technology for storage of information, such as computer readable instructions, data structures, program modules, or other data. Computer-readable memory 802, as well as the removable storage 804 and non-removable storage 806, are all examples of non-transitory computer-readable storage media. Non-transitory computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the mobile device 106. Any such non-transitory computer-readable storage media may be part of the mobile device 106.

The mobile device 106 may further include one or more input devices 808, including, without limitation, a touch screen (e.g., touch, or proximity-based) display, physical buttons (e.g., keyboard or keypad), a camera-based sensor configured to receive gestural input from a user, a microphone or microphone array for receiving voice input commands from a user, pointing devices (e.g., mouse, pen, stylus, etc.), or any other suitable input devices 808 coupled communicatively to the processor(s) 800 and the computer-readable memory 802. The mobile device 106 may further include one or more output devices 810, including, without limitation, a display, one or more light-emitting diode (LED) indicators, speakers, a printer, or any other suitable output device coupled communicatively to the processor(s) 800 and the computer-readable memory 802.

The mobile device 106 may further include communications interface(s) 812 that allow the mobile device 106 to communicate with other computing devices 814 such as via a network (e.g., a cellular network, a radio air interface, etc.). The communications interface(s) 812 may facilitate transmitting and receiving wireless signals over any suitable wireless communications/data technology, standard, or protocol, as described above, such as using licensed, semi-licensed, or unlicensed spectrum over a telecommunications network. For example, the communication interface(s) 812 may represent at least one cellular radio (or cellular radio chip/chipset), at least one wireless IEEE 802.1x-based radio interface (e.g., a WiFi radio chip/chipset), as well as other types of wireless (e.g., Bluetooth®) and wireline communications interfaces.

In some embodiments, the computer-readable memory 802 may include a client application 504, as described herein, which is configured to collect data samples 108 including one or more network metrics 112 in response to triggering events, such as those described with reference to the process 600 of FIG. 6, store the collected data samples 108 in memory/storage 802/804/806, and send (e.g., at a later time) one or more data samples 108 (e.g., all data samples 108) collected over a period of time, such as those data samples 108 collected over one day, to a remote system 110 (e.g., via the communications interface(s) 812). In general, the client application 504 represents logic (e.g., hardware, software, and/or firmware) and/or computer-executable instructions stored in the memory 802 and executable by the processor(s) 800 to perform operations described herein. It is to be appreciated that the mobile device 106 may include components and/or functionality for performing any of the other techniques and functionality described herein with respect to the mobile device 106, such as conducting communication sessions or providing interfaces to query network metrics. For example, a SIP client may be used to establish communication sessions over a mobile network via cells 104, such as base stations, eNB cells, gNB cells, etc.

Figure 9:
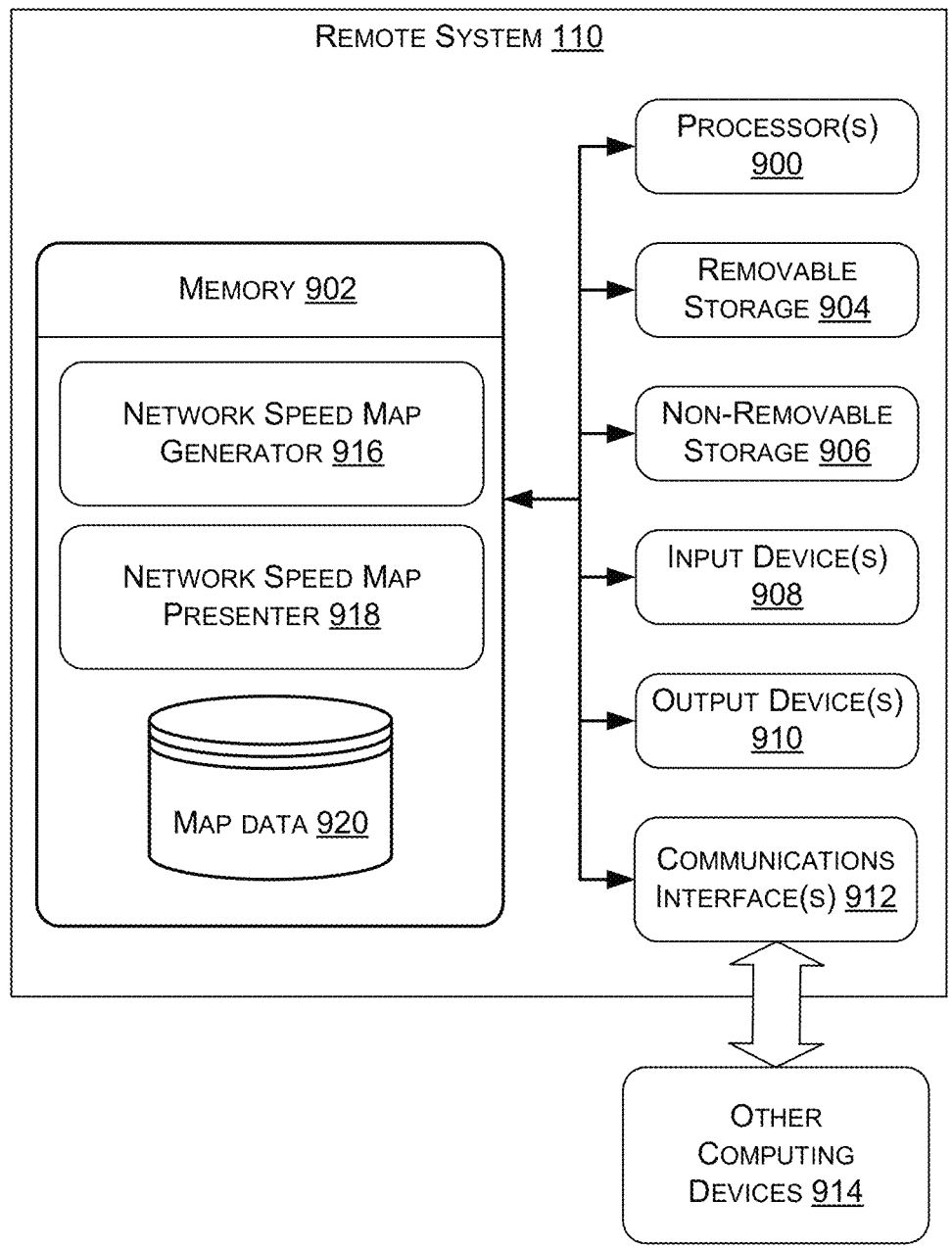
FIG. 9 is a block diagram of an example remote system architecture, in accordance with various embodiments.

FIG. 9 is a block diagram of an example remote system 110 architecture, in accordance with various embodiments. As shown in FIG. 9, the remote system 110 may include one or more processors 900 and one or more forms of computer-readable memory 902. The remote system 110 may also include additional storage devices. Such additional storage may include removable storage 904 and/or non-removable storage 906. Computer-readable memory 902, removable storage 904 and non-removable storage 906 are all examples of non-transitory computer-readable storage media, and they may be implemented similarly to the computer-readable memory 802, removable storage 804 and non-removable storage 806 described above with respect to the mobile device 106. Accordingly, detailed explanation of these components will not be repeated, as reference can be made to components 802, 804, and 806 to understand example implementations of the components 902, 904, and 906.

The remote system 110 may further include input devices 908 (e.g., a touch screen, keypad, keyboard, mouse, pointer, microphone, etc.) and output devices 910 (e.g., a display, printer, speaker, etc.) communicatively coupled to the processor(s) 900 and the computer-readable memory 902. The remote system 110 may further include a communications interface(s) 912 that allows the remote system 110 to communicate with other computing devices 914 (e.g., mobile devices 106, IMS nodes, etc.) such as via a network(s) (e.g., a telecommunications network, cellular network, and/or IMS network). The communications interface(s) 912 may facilitate transmitting and receiving wired and/or wireless signals over any suitable communications/data technology, standard, or protocol, as described herein.

In some embodiments, the computer-readable memory 902 may include a network speed map generator 916, a network speed map presenter 918, and map data 920. The network speed map generator 916 and the network presenter 918, with access to map data 920 (among other data), may be configured to implement the techniques and processes described herein, such as creating a network speed map and causing presentation of the network speed map on a display of a user computing device(s). In general, the components 916 and 918 represents logic (e.g., hardware, software, and/or firmware) and/or computer-executable instructions stored in the memory 902 and executable by the processor(s) 900 to perform operations described herein, such as those described herein with reference to the example processes 100 and 700, as well as the block diagram of FIG. 5.

Although many of the examples provided herein describe estimating a data rate in the form of a download speed, it is to be appreciated that the same, or similar, methodology can be implemented to estimate upload speeds provided by a mobile network. In the case of upload speeds, the CQI values that are used to estimate the upload speed may be associated with the quality of the channel in the uplink direction (as opposed to the downlink direction). Accordingly, although download speed is predominantly used in the examples herein, the present disclosure is not limited to estimating download speeds of a mobile network, and any data rate can be estimated for the network speed map. Furthermore, it is to be appreciated that a real-time data rate (e.g., download speed) estimate may be determined for an individual mobile device 106 based on a CQI value determined for the mobile device.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

The invention claimed is:

1. A computer-implemented method comprising:
   receiving, by a server computer, from a plurality of mobile devices within a geographical area, a plurality of data samples, each data sample including a geolocation;
   selecting, by the server computer, a subset of data samples that specify geolocations within a bin within the geographical area;
   estimating, by the server computer, a download speed associated with the bin based at least in part on a spectrum efficiency value, a total number of resource elements in a subframe, and an overhead value;
   generating, by the server computer, a network speed map of the geographical area that indicates at least the download speed associated with the bin;
   receiving location data indicating a current location of a user computing device;
   causing presentation of the geographical area in a user interface with multiple selectable bins, including the bin, presented within the geographical area;
   receiving an indication that the bin has been selected on the user computing device; and
   causing presentation of the download speed associated with the bin within a pop-up window on the user interface.

2. The computer-implemented method of claim 1, wherein each data sample includes a Channel Quality Indicator (CQI) value.

3. The computer-implemented method of claim 1, further comprising:
   integrating the network speed map with a network coverage map; and
   causing the presentation of the network speed map integrated with a cellular network coverage map of the geographical area.

4. The computer-implemented method of claim 1, further comprising the estimating the download speed by:
   determining the total number of resource elements in the subframe for a particular network bandwidth based at least in part on a number of physical resource blocks (PRBs) associated with the particular network bandwidth and a number of subcarriers per PRB;
   determining a product of the spectrum efficiency value and the total number of resource elements in the subframe to obtain a raw download speed value;
   determining a percentage of data sent in a downlink direction that represents control data or synchronization data;
   multiplying the raw download speed value by the percentage to determine the overhead value; and
   subtracting the overhead value from the raw download speed value to obtain the download speed associated with the bin.

5. The computer-implemented method of claim 1, wherein the bin is at least one of a square or a hexagon, and wherein a side of the square or a radius of the hexagon is no greater than about 10 meters.

6. The computer-implemented method of claim 1, wherein the subset of data samples are selected over a time window that is at least one of multiple weeks or a month.

7. The computer-implemented method of claim 1, wherein the indication comprises a first indication, the bin comprises a first bin, the download speed comprises a first download speed, and the pop-up window compromise a first pop-up window, computer-implemented method further comprising:

receiving a second indication that a second bin has been selected on the user computing device; and
causing presentation of a second download speed associated with the second bin within a second pop-up window on the user interface.

8. A system comprising:
a processor; and
memory storing computer-executable instructions that, when executed by the processor, cause the system to:
receive from a plurality of mobile devices within a geographical area, a plurality of data samples, each data sample including a geolocation;
selecting a subset of data samples that specify geolocations within a bin within the geographical area;
estimating a download speed associated with the bin based at least in part on a spectrum efficiency value, a total number of resource elements in a subframe, and an overhead value;
generate a network speed map of the geographical area that indicates at least the download speed associated with the bin;
receive location data indicating a current location of a user computing device;
cause presentation of the geographical area in a user interface with multiple selectable bins, including the bin, presented within the geographical area;
receive an indication that the bin has been selected on the user computing device; and
cause presentation of the download speed associated with the bin within a pop-up window on the user interface.

9. The system of claim 8, wherein the memory storing computer-executable instructions, when executed by the processor, further cause the system to:
determine, for a subset of the data samples that specify geolocations within a bin within the geographical area, efficiency values that correspond to CQI values specified in the subset of the data samples;
determine the spectrum efficiency value associated with the bin based at least in part on the efficiency values; and
estimate a data rate associated with the bin based at least in part on the spectrum efficiency value, wherein estimating the data rate associated with the bin is further based on the total number of resource elements in a subframe, and the overhead value.

10. The system of claim 9, wherein determining the spectrum efficiency value based at least in part on the efficiency values comprises calculating an average of the efficiency values.

11. The system of claim 9, wherein the estimating of the data rate associated with the bin comprises:
determining a product of the spectrum efficiency value and the total number of resource elements in the subframe to obtain a raw data rate value; and
subtracting the overhead value from the raw data rate value to obtain the data rate associated with the bin.

12. The system of claim 9, wherein:
the computer-executable instructions, when executed by the processor, further cause the system to receive, from the user computing device, location data indicating a current location of the user computing device that is within the geographical area; and
causing the presentation of the network speed map on the user interface of the user computing device comprises causing presentation of the geographical area including the bin based at least in part on the location data.

13. The system of claim 9, wherein causing the presentation of the network speed map on the user interface of the user computing device comprises:
causing presentation of the geographical area in a user interface with multiple selectable bins, including the bin, presented within the geographical area;
receiving an indication that the bin has been selected on the user computing device; and
causing presentation of the data rate associated with the bin on the user interface.

14. A server comprising:
a processor; and
memory storing computer-executable instructions that, when executed by the processor, cause the server to:
receive from a plurality of mobile devices within a geographical area, a plurality of data samples, each data sample including a geolocation;
select a subset of data samples that specify geolocations within a bin within the geographical area;
estimate a download speed associated with the bin based at least in part on a spectrum efficiency value, a total number of resource elements in a subframe, and an overhead value;
generate a network speed map of the geographical area that indicates at least the download speed associated with the bin;
receive location data indicating a current location of a user computing device;
cause presentation of the geographical area in a user interface with multiple selectable bins, including the bin, presented within the geographical area;
receive an indication that the bin has been selected on the user computing device; and
cause presentation of the download speed associated with the bin within a pop-up window on the user interface.

15. The server of claim 14, wherein each data sample includes a Channel Quality Indicator (CQI) value.

16. The server of claim 14, wherein the memory storing computer-executable instructions, when executed by the processor, further cause the server to:
integrate the network speed map with a network coverage map; and
cause the presentation of the network speed map integrated with a cellular network coverage map of the geographical area.

17. The server of claim 14, wherein the memory storing computer-executable instructions, when executed by the processor, further cause the server to estimate the download speed by:
determining the total number of resource elements in the subframe for a particular network bandwidth based at least in part on a number of physical resource blocks (PRBs) associated with the particular network bandwidth and a number of subcarriers per PRB;
determining a product of the spectrum efficiency value and the total number of resource elements in the subframe to obtain a raw download speed value;
determining a percentage of data sent in a downlink direction that represents control data or synchronization data;
multiplying the raw download speed value by the percentage to determine the overhead value; and
subtracting the overhead value from the raw download speed value to obtain the download speed associated with the bin.

18. The server of claim 14, wherein the bin is at least one of a square or a hexagon, and wherein a side of the square or a radius of the hexagon is no greater than about 10 meters.

19. The server of claim 14, wherein the subset of data samples are selected over a time window that is at least one of multiple weeks or a month.

20. The server of claim 14, wherein the indication comprises a first indication, the bin comprises a first bin, the download speed comprises a first download speed, and the pop-up window compromise a first pop-up window, computer-implemented method further comprising:
   receiving a second indication that a second bin has been selected on the user computing device; and
   causing presentation of a second download speed associated with the second bin within a second pop-up window on the user interface.

\* \* \* \* \*